United States Patent [19]

Lewis

[11] Patent Number: 5,651,496

[45] Date of Patent: Jul. 29, 1997

[54] METHOD FOR LOW TEMPERATURE BIMETALLIC FORMATION OF DUCTILE SINGLE MATERIAL WITH TWO METAL LAYERS

[76] Inventor: Philip C. Lewis, 6307 Toledo, Houston, Tex. 77008

[21] Appl. No.: 521,833

[22] Filed: Aug. 31, 1995

[51] Int. Cl.$^6$ .............................. B23K 20/24; B23K 20/04
[52] U.S. Cl. .................... 228/208; 228/235.3; 228/265
[58] Field of Search .................................. 228/116, 208, 228/235.2, 235.3, 265

[56] References Cited

U.S. PATENT DOCUMENTS 2,267,665  12/1941  Raydt et al. ............................ 228/127
2,879,587  3/1959  Mushovic et al. ..................... 228/235.3

*Primary Examiner*—Kenneth J. Ramsey
*Attorney, Agent, or Firm*—Parks and Associates P.C.

[57] ABSTRACT

A process for forming a single material from two layers of metal materials by heating and pressing the two metals together under pressure where a first metal has a relatively higher temperature of plastics formation state and the second metal has a relatively lower temperature of plastics formation state comprising the steps of cleaning the surface of the first and second metal, then electroplating a thin layer of the second metal onto the surface of the first metal, then heating the first metal and the thin layer of the second metal electroplated thereon to the temperature of plastics formation state in the second metal, and heating the second metal to the temperature of plastics formation state, and mechanically pressing the thin layer of the second metal on the first metal together with the second metal to form a single ductile material having two layers of said first and second metals. In a preferred operating method the first metal is from a group of iron metals and their alloys, which are capable of electroplating the second metal thereon and the second group of metal is from Zinc and Zinc Aluminum, having no more than 15% of Aluminum alloyed therein, and the temperatures of plastics formation state are relatively low temperatures in the ranges of 300 degrees F. (149 degrees C.) to 750 degrees F. (399 degrees C.).

7 Claims, 2 Drawing Sheets

METHOD FOR LOW TEMPERATURE BIMETALLIC FORMATION OF DUCTILE SINGLE MATERIAL WITH TWO METAL LAYERS

FIELD OF INVENTION

This invention relates to a method for forming a single material from two layers of metal materials by heating and pressing the two metals together under pressure where in a first metal having a relatively higher temperature of plastics formation state and the second metal having a relatively lower temperature of plastics formation state comprises the steps of cleaning the surfaces of the metals, electroplating a thin layer of the second metal on to the first metal and then heating the first metal with the second metal plated thereon and the second metal to the relatively low temperature of plastic formation states of the second metals, and then mechanically pressing the thin layer of the second metal electroplated on the first metal to the second metal to form a single ductile material having two layers of said first and second materials. The bimetallic material of this invention can be in the form of sheets, plates, wire, rods, tubes or pipes and can be made bimetallic in their shaped form or as metals to be formed. The method of this invention can provide products which are strong, ductile and corrosion resistant in many environments, such as for example corrosion resistant rods, plates, tubes, and pipes.

BACKGROUND OF THE INVENTION

The prior art has for many years used many and varied methods to form doubled layer materials, especially for the wrapping of rods, tubes, pipes, cables, and other materials to either protect them from their operating environments or to give them strength.

For example the automotive industry has developed safety standards for critical elements in automotive parts such as brake linings to be resistant to failure in high vibration environments and to resist corrosion failures. While these processes, such as in U.S. Pat. No. 5,145,103 issued to Arnold T. Johnson, have used the concepts of electroplating and brazing alloys on the non-ferritic steels surfaces prior to formation of the double wall tubing, thus it was used as a way to spread the brazing. The brazing alloys thus coated the non-ferritic tubing in anticipation of the addition of a selected metal or metal alloy being added to the non-ferric steel tubing surface. Then the method of "fusion" using "Liquidus temperature" was applied to it to cause the selected metal to fuse with the non-ferritic steel by means of the brazing alloys. This fusion process at "Liquidus temperature" was defined as the temperature at which a metal or metal alloy begins to enter its molten state which in this prior art required it to reach the point of brazed fusion between the non-ferritic steel and the metal selected. This temperature of "Liquidus" is a temperature above 1,981 degrees F. in some cases, where the other metal is for example copper. The methods of this type process required also very special and controlled gaseous materials in the various processes to achieve the desired results of theses type methods.

In yet other methods, for example U.S. Pat. No. 2,197,191 issued to Charles A. Nichols etc..; U.S. Pat. No. 2,234,450 issued to B. L. Quarnstrom; and other methods used by the prior art for bimetallic materials formation, two different materials were simply mechanically wrapped about each other and they were then brazed at their points of union to form a bimetallic tube. In some cases these finished bimetallic tube materials were then electroplated with tin, zinc, cadmium etc., after these tubes had been cut into the desired lengths and shapes. While these methods formed usable bimetallic materials for some applications they were not very successful in environments where corrosive liquids worked their way through the outer jacket through small or microscopic holes because there were no bonds between the two wrapped materials and thus the corrosive fluids seeped and flowed therebetween and could corrode the whole interior material and cause failure therein. The one advantage of this type prior art was the ability to get a bimetallic material which had a relatively thick outer layer of material and because of the mechanical nature of the wrapping they formed a more ductile material also.

In yet other prior art such as methods using conventional hot dip galvanized coating by hot dipping of one material, such as an iron formed material, into another at a liquid state, such as Zinc at 450 degrees C., the ability to get relatively thick outer or second layers of the liquified material on the dipped material was limited to thickness of about 80 microns of thickness and therefor limited the usefulness of the resulting products of this process. Further there were formed in such processes intermetallic compounds of Fe-Zn in the case of the use of those materials, which caused brittleness in the bimetallics using the methods of the hot dip type. Further in these type process very high temperatures and controlled conditions were required as these operations occur at liquid or molten metal states with the problems inherent with those processes.

In some prior art the use of mechanical cladding was accomplished by placing a brazing material on one sheet or the other or both and then rolling them together under pressure rollers and applying heat sufficient to cause the materials to stick together. While this provided a bimetallic material, it produced one which had very limited integrated ductility and almost no bonding of the two materials together, other than as a glue would bind two piece of material together.

OBJECTS OF THE INVENTION

It is an object of this invention to form a bimetallic material which may be extruded, cladded, or otherwise formed by a process which is relative simple, inexpensive and may be practiced at relatively low temperatures.

Yet another object of this inventive method is to create a bimetallic material which has a relatively thick coat of one metal about the other and has no intermetallic compounds of iron and zinc or zinc aluminum compounds between the two materials Also an object of this method is to provide a bimetallic material which has no voids as in mechanical bonds between the two materials, such as between iron and zinc etc., to allow sites for corrosion of the iron material to occur.

Still a further object of this invention is to provide a metallurgical bond between the second metal, such as zinc and zinc aluminum, and an electroplated bond between the two metal materials which form the bimetallics of this inventive method.

It is also an object of this invention to provide a metallurgical bond between the second metal, such as zinc and zinc aluminum, at relatively low temperatures and in the ambient atmosphere with only oxygen removed to prevent the reformation of oxidation, but without the need of special atmospheric conditions.

Another object of this invention is to provide a method which may be practiced at the time the desired product is being manufactured in the shape and size of the desired product and not have this method practiced and then the product desired manufactured. For example in the case of extruded tube or pipe, the finished product comes out as a bimetallic pipe or tube at the completion of the practice of this method of invention.

One other object of this invention is to provide a method for the formation of a complete jacket about a rod, tube, or pipe of iron, which can be made into a continuous string of great length and still maintain the over all ductility of the finished product, with it's metallurgically bonded coating in place.

Also as the temperatures used are low, in the range from 300 degrees F. (149 degrees C.) and 750 degrees F. (399 degrees C.) the iron tubing product can be used as a structural element in the process of extruding the zinc or zinc aluminum material thereon because the strength of the iron tubing is not affected at that temperature.

Yet other and further objects of the inventive method of this invention will become obvious and pointed out in connection with the accompanying drawing and disclosure which will illustrate one of the various embodiments of the invention and its several themes and variations and the preferred operating conditions of the method of this invention.

IN THE DRAWINGS

DETAILED SPECIFICATION

Figure 1:
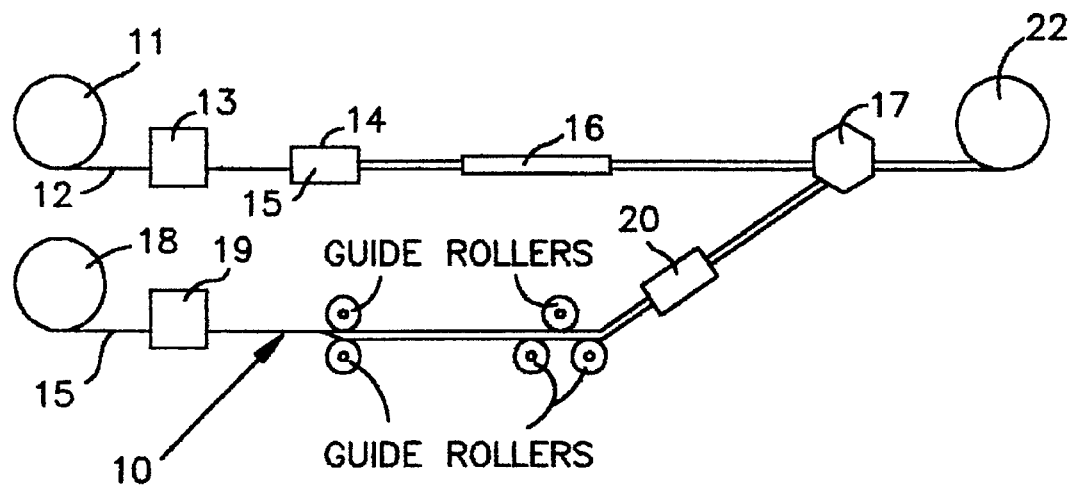
FIG. 1 is a diagrammatic drawing of the practice of this inventive method for the formation of bimetallic materials, when the extrusion process is used in the pressing of the thin layer of the second metal on the first metal together with the second metal to form a single ductile material having two layers.

Referring to FIG. 1 the production line 10 of the practice of this method is shown in the form of an extrusion process production line. More particularly, in FIG. 1 there is shown a feed reel 11 for the supplying of a first metal 12 to a cleaning zone 13. It will be understood by those skilled in the art that cleaning includes the descaling, decreasing, and generally stripping of the metal to the bare metal as part of the cleaning zone process. From the cleaning zone 13, the first metal is fed to an electroplating area 14.

The electroplating area 14 provides an electroplating process for the providing of a thin layer of the metal in the electroplating bath to plate the first metal 12. For example only the first metal 12 could be steel tube and the second metal 15 in the electroplating bath area 14 could be a zinc material. Thus the first metal 12 would enter the electroplating bath area 14 and have a thin layer of the second metal 15, in this example zinc, electroplated onto the surface of the first metal 12. It should be appreciated by those skilled in the art that the first metal 12, a steel tube in this example, would be completely coated with a thin layer of the second metal 15, in this example zinc, on all its exposed surfaces as it passed through this plating bath area 14.

From the electroplating area 14 the first metal 12, now electroplated with a thin layer of said second metal 15 is now feed to a heater zone 16 for heating the first metal 12, now electroplated with a thin layer of the said second metal 15, to a temperature sufficient to raise the first metal 12 and the thin layer of the second metal 15 to the temperature of plastics formation state in the second metal 15. The plastics formation state in the case of the example using zinc as the second metal is between a range of temperatures from 300 degrees F. (149 degrees C.) to 500 degrees F. (260 degrees C.). It should be understood by those skilled in the art that if the upper range of temperatures is exceeded in the case of the example of zinc, ie. reach the melting temperature, then melting of the thin layer of said second metal 15, zinc, would occur and an intermetallic compounds may be formed which will provide an inferior product in it useful life, albeit that the product may end up with what appears to be a good looking bimetallic product at the end of the process. Should temperatures in the case of zinc reach 787 degrees F. or 420 degrees C. the melting of zinc occurs and hot shortness begins to occur, with the results that the zinc will flake from the product and good results will not occur. Even if the product did not flake, it would have formed only a mechanical bond rather than a metallurgical bond which is not the desired result of the teachings of this method.

Simultaneously, with the above process on first metal 12, a feed reel 18 is supplying said second metal 15 therefrom, feding it to a cleaning zone 19 for cleaning the second metal 15. From the cleaning zone 19 the second metal 15, which for example only here is a zinc material, is fed to a heater zone 20 where the second material 15 is heated to it's temperature of plastics formation state.

Concurrently, from the heater zone 16, the first metal 12 with it's thin layer of said second metal 15 in it's plastics formation state, and from the heater zone 20, the second metal 15 in it's plastic formation state, both are fed into an extruder 17. It should be understood by those skilled in the art that both first metal 12 and second metal 15 must have their temperatures maintained to their plastic formation states as they enter the extruder 17, which can best be seen at FIG. 2. If the temperatures drop, then greater extrusion pressure can be used to bring their temperature back up to their plastic formation states.

Figure 2:
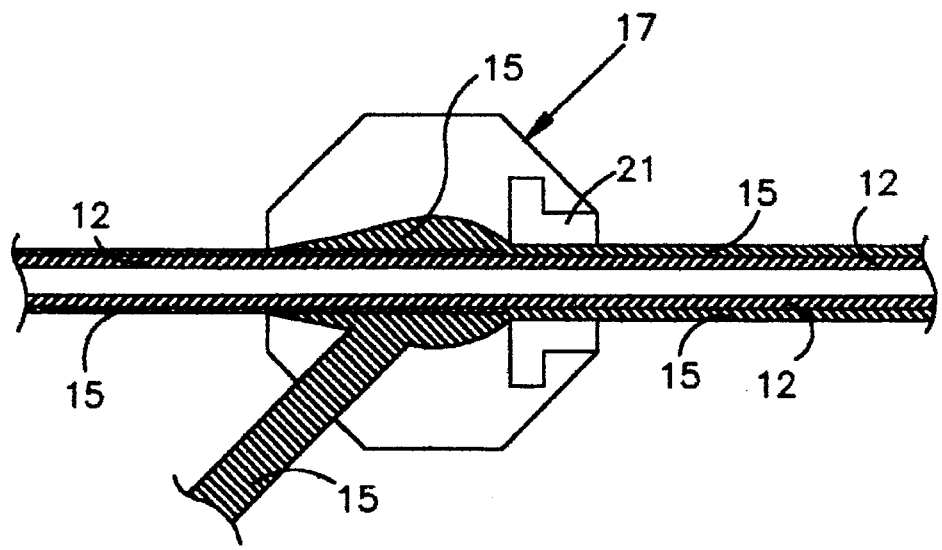
FIG. 2 is a diagrammatic drawing of the extrusion or pressure application in FIG. 1 to achieve the practice of this invention in creating a bimetallic tube or pipe which has the second metal material completely covering the exterior surface of the rod or tube or pipe.
Figure 3:
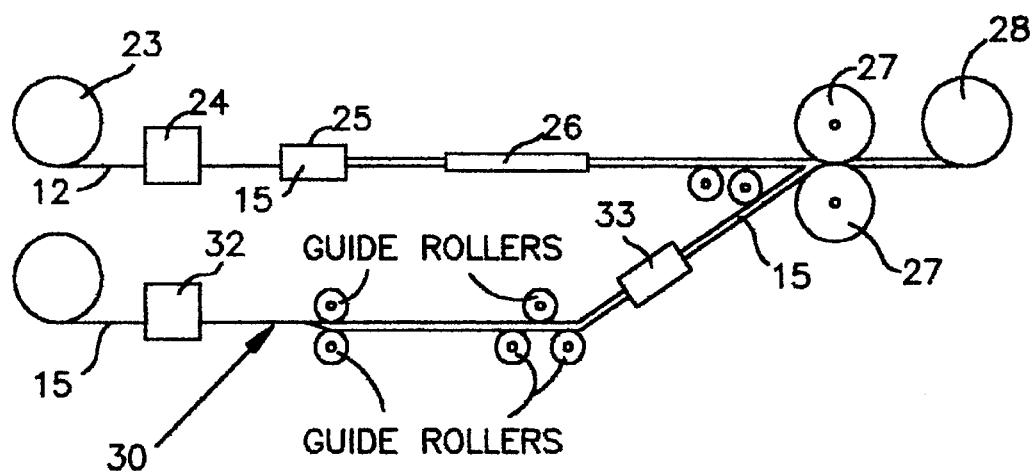
FIG. 3 is a diagrammatic drawing of the practice of this inventive method for the formation of bimetallic materials, when the rolling process is used in the pressing of the thin layer of the second metal on the first metal together with the second metal to form a single ductile material having two layers.

The first metal 12 with the thin layer of the second metal 15 on the first metal 12 is passed through an extrusion die 21, as best shown in FIG. 2, and the second metal 15 from the heater zone 20 is also fed into this extrusion die 21, but the second metal 15 from heater zone 20 is forced and pressed between the first metal 12 with the thin layer of the second metal 15 and the extrusion die 21 such that a great mechanical pressing of the thin layer of the second metal 15 electroplated on the first metal 12 and the second metal 15 being fed from the heater zone 20 is provided. It will be understood by those skilled in the art that for the above described extrusion process to be successful it requires that said first metal 12 have sufficient strength to provide a mandrel effect against the pressure which is generated by the pressing of the second metals 12 and the extrusion die 21. Clearly the first metal 12, must not be close to its temperatures of plastics formation state, while the second metals 15 are at their temperatures of plastics formation state for at least this one reason of providing sufficient strength to provide the mandrel effect, as well as other metallurgical reason, which will be apparent to those skilled in the art.

From the extruder 17 the newly formed bimetallic metal is fed to a take up reel 22 for storage or shipment and use for its desired purpose.

It has been found that some of the second metals 14, which achieve good results using the method of this invention are zinc and zinc aluminum alloys, where the aluminum does not exceed 15% of the alloy content. It should further be obvious that the first metal 12 must be capable of being electroplated with the second metal 14 and it has been found that iron and steel and their alloys capable of being plated are good material to be used as first metals 12. It will be further appreciated that any material which provides the above physical properties will also provide the same and similar results and be within the teaching and scope of this invention.

In yet another example a production line, shown generally at 30, for producing clad bimetallic materials from a rolling process is shown. The first metal 12, which is sheet materials in this example, is fed of feed reel 23 and into a cleaning zone 24 for cleaning the material. The first metal 12 is passed through the cleaning zone 24 and out to the electrical plating area 25, which has for example Zinc Sulfate, ie the second metal 15, in the plating solution.

The first metal 12, which in this case is a sheet material made of an iron alloy, is then passed through the electrical plating area 25 and a thin layer of the second metal 15 is electroplated thereon, for example a zinc aluminum alloy with a maximum of less that 15% aluminum. The first metal 12 is then passed through a heater zone 26 where, now the electroplated thin layer of said second metal 15 is now heated, to a temperature sufficient to raise the first metal 12 and the thin layer of the second metal 15 to the temperature of plastics formation state in the second metal 15. The plastics formation state in the case of the example using zinc aluminum as the second metal is between a range of temperatures from 300 degrees F. (149 degrees C.) to 750 degrees F. (399 degrees C.). It should be understood by those skilled in the art that if the upper range of temperatures is exceeded in the case of the example of zinc aluminum alloy should occur, melting of the thin layer of said second metal 15, zinc aluminum, would occur and an intermetalic compounds may be formed which will provide an inferior product in it useful life, albeit that the product may end up with what appears to be a good looking bimetallic product at the end of the process.

It should further be understood by those skilled in the art that if the upper range of temperatures is exceeded in the case of the example of zinc aluminum alloys, ie. reach the melting temperature, then melting of the thin layer of said second metal 15, zinc aluminum alloys, would occur and an intermetallic compounds may be formed which will provide an inferior product in it useful life, albeit that the product may end up with what appears to be a good looking bimetallic product at the end of the process. Should temperatures in the case of zinc aluminum alloys reach the melting point of the zinc aluminum alloys hot shortness begins to occur, with the results that the zinc aluminum alloys will flake from the product and good results will not occur. Even if the product did not flake, however it would have formed only a mechanical bond rather than a metallurgical bond which is not the desired result of the teachings of this method.

Simultaneously, with the above process on first metal 12, a feed reel 31 is supplying said second metal 15 therefrom, feeding it to a cleaning zone 32 for cleaning the second metal 15. From the cleaning zone 32 the second metal 15, which for example only here is a zinc aluminum material is fed to a heater zone 33 where the second material 15 is heated to it's temperature of plastics formation state. Concurrently, from the heater zone 26, the first metal 12 in it;s plastic formation state, and from the heater zone 33, the second metal 15 in it's plastic formation state, both are fed into a pair of pressure rollers 27. it should be understood by those skilled in the art that both first metal 12 and second metal 15 must have their temperatures maintained to their plastic formation states as they enter the pair of pressure rollers 27, which can best be seen at FIG. 4.

Figure 4:
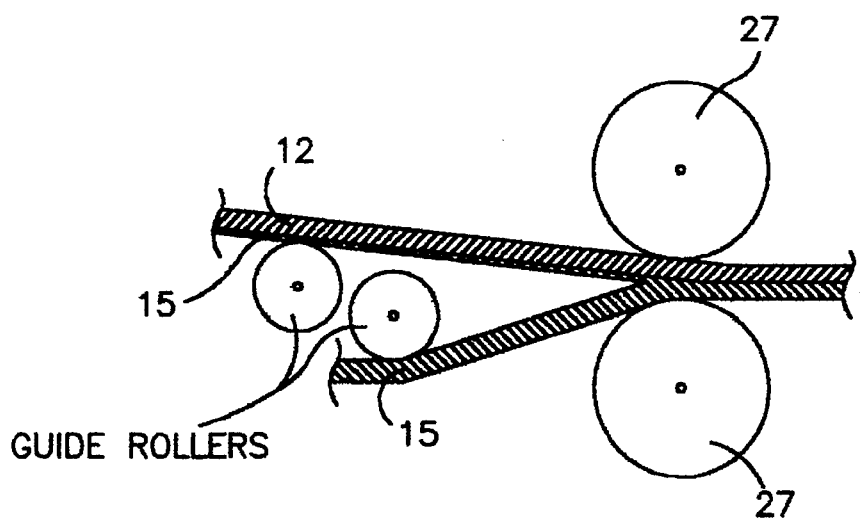
FIG. 4 is a diagrammatic drawing of the use of pressure rollers, in FIG. 3, to apply the pressure for mechanically pressing the thin layer of the second metal on the first metal together with the second metal to form a single ductile material having two layers of said first and second metals.

The first metal 12 with the thin layer of the second metal 15 on the first metal 12 is passed through a pair of pressure rollers 27, as shown in FIG. 4, and the second metal 15 from the heater zone 33 is also feed into this pair of pressure rollers 27, and the second metal 15 from heater zone 33 is pressed between the first metal 12 with the thin layer of the second metal 15 and the pressure rollers 27 such that a great mechanical pressing of the thin layer of the second metal 15 electroplated on the first metal 12 and the second metal 15 being fed from the heater zone 33 is provided. It will be understood by those skilled in the art that for the above described pressing process to be successful it requires that said first metal 12 have sufficient strength to provide a mandrel effect against the pressure which is generated by the pressing of the second metals 12 and the pressure rollers 21. Clearly the first metal 12, must not be close to its temperatures of plastics formation state, while the second metals 15 are at their temperatures of plastics formation state for at least this one reason of providing sufficient strength to provide the mandrel effect, as well as other metallurgical reason, which will be apparent to those skilled in the art.

It will be understood that for the finished product to have the desired finish thickness of from 0.1 mm to 10 mm of said second metal 15 present in the finished product that the second metal 15 in the starting steps of this method would have a range of thicknesses greater than the desired finish range on being fed into the pressure rollers 27 to adjust for the deformation which will occur in the second metal 15 as it is fed through the pressure rollers 27.

From the pressure rollers 27 the newly formed bimetallic metal is fed to a take up reel 28 for storage or shipment and use for its desired purpose.

From the above disclosure and the specification and claims to follow it will be apparent that the teaching of this invention could be modified and still practice the method taught in this patent, as this patent only sets out some examples of the preferred embodiment and teaching of this method herein invented and claimed.

What I now claim is:

1. A process for forming a single material from two layers of first and second metal materials by heating and pressing the two metal materials together under pressure where a first metal is an iron based metal capable of having a second metal electroplated thereon and its temperature of plastics formation state is higher than the plastics formation temperature state for the second metal and said second metal is a metal selected from a group of metals consisting of zinc, and zinc aluminum alloys having no more than up to 15% Aluminum and have a relatively lower temperature of plastics formation state than the first metal comprising the steps of:

Cleaning the surface of the first metal,

Cleaning the surface of the second metal,

Electroplating a thin layer of the second metal to at least a thickness of at least 0.1 micron onto the surface of the first metal, Heating the first metal and the thin layer of the second metal electroplated thereon to the temperature of plastics formation state in the second metal, Heating the second metal to the temperature of plastics formation state therein, and Mechanically pressing the thin layer of the second metal on the first metal together with the second metal to form a single ductile material having two layers of said first and second metals.

2. A process of claim 1 wherein said second metal is pressed on to said first metal with said thin layer of said second metal electroplated thereon in a relatively thick layer to form a single ductile material having two layers of said first and second metals.

3. A process of claim 2 wherein said layer of said second metal is pressed to provide a finished layer of said second metal of a thickness of from 0.1 mm to 10 mm after mechanically pressing the second metal on to the first metal.

4. A process of claim 3 wherein said heating of said second metal to plastics formation state temperature is from a range of temperatures of from 300 degrees F. to 750 degrees F. (149 degrees C. to 399 degrees C.).

5. A process of claim 4 wherein said heating of said second metal to plastics formation state temperature is from a range of temperatures of from 300 degrees F. to 500 degrees F. (149 degrees C. to 260 degrees C.).

6. A process of claim 2 wherein said mechanically pressing process of pressing said first and second metals together comprises extruding said second metal over and about said first metal having said thin layer of said second metal electroplated thereon at sufficient pressure to form a single ductile material having two layers with said second metal being on the inside and said first metal being completely covered from outside exposure.

7. A process of claim 6 wherein said first metal may be either a solid rod, or a hollow tube having a second metal electroplated thereon and said second metal is extruded over and about said first metal tube having said thin layer of said second metal electroplated thereon at sufficient pressure to form a single ductile material having two layers with said second metal being fully covering said first metal tube from outside exposure.

* * * * *